US009274228B2

(12) United States Patent
Lobo

(10) Patent No.: US 9,274,228 B2
(45) Date of Patent: *Mar. 1, 2016

(54) POSITIONING SATELLITES

(71) Applicant: Nokia Corporation, Espoo (FI)

(72) Inventor: Natividade Albert Lobo, Windsor (GB)

(73) Assignee: Nokia Technologies Oy, Espoo (FI)

( * ) Notice: Subject to any disclaimer, the term of this patent is extended or adjusted under 35 U.S.C. 154(b) by 138 days.

This patent is subject to a terminal disclaimer.

(21) Appl. No.: 14/447,070

(22) Filed: Jul. 30, 2014

(65) Prior Publication Data

US 2015/0285919 A1 Oct. 8, 2015

Related U.S. Application Data

(63) Continuation-in-part of application No. 13/517,027, filed as application No. PCT/EP2009/067782 on Dec. 22, 2009, now Pat. No. 8,843,251.

(51) Int. Cl.
*G05D 1/00* (2006.01)
*G01S 19/27* (2010.01)

(52) U.S. Cl.
CPC .................................. *G01S 19/27* (2013.01)

(58) Field of Classification Search
CPC ........................................................ G01S 19/27
See application file for complete search history.

(56) References Cited

U.S. PATENT DOCUMENTS

| 6,138,061 | A | 10/2000 | McEnnan et al. |
| 6,337,657 | B1 * | 1/2002 | Zhodzishsky et al. ... 342/357.31 |
| 2008/0111738 | A1 * | 5/2008 | Han ......................... 342/357.12 |
| 2008/0177430 | A1 * | 7/2008 | Tekawy et al. .................. 701/13 |

OTHER PUBLICATIONS

Extended European Search Report for Application No. 14191319-1812 dated Apr. 13, 2015.
Extended European Search Report for Application No. 14191355-1812/ 2843442 dated Apr. 15, 2015.
Jorg Waldvogel: "Quaternions and the Perturbed Kepler Problem", Celestial Mechanics and Dynamical Astronomy, Kluwer Academic Publishers, DO, vol. 95, No. 1-4, Aug. 17, 2006, pp. 201-212.
Vrbik, et al: "Solving Lunar problem Via Perturbed K-S equation", New Astronomy, North-Holland, Amsterdam, NL, vol. 11, No. 5, Mar. 1, 2006, pp. 366-373.
Gennadii Alimov, et al: "Approximate Analytical Theory of Satellite Orbit Prediction Presented in Spherical Coordinates Frame", Celestial Mechanics and Dynamical Astronomy, Kluwer Academic Publishers, DO, LNKD—vol. 81, No. 3, Nov. 1, 2001, pp. 219-234.

(Continued)

*Primary Examiner* — Mary Cheung
*Assistant Examiner* — Yuen Wong
(74) *Attorney, Agent, or Firm* — Locke Lord LLP

(57) ABSTRACT

A method comprising: receiving first information for defining a first algebraic function that relates a time variable to a first mapped variable; using the function to convert a time variable value to a first value of the first mapped variable e.g. s; converting the first value of the first mapped variable to a second value of a second mapped variable e.g. U; and positioning a satellite by converting the second value of the second mapped variable value to a position value that positions a satellite.

14 Claims, 5 Drawing Sheets

(56) References Cited

OTHER PUBLICATIONS

L. Lin, et al: "An Analytical Method for Satellite Orbit Predication", Chinese Astronomy and Astrophysics, Pergamon LNKD—Jan. 1, 2006, pp. 68-74.

Jan Vrbik: "Iterative Solution to Perturbed Kepler Problem VIA Kustaanheimo-Stiefel Eqaution", Celestial Mechanics and Dynamical Astronomy, Kluwer Academic Publishers, DO, LNKD—vol. 71, No. 4, Aug. 1, 1998, pp. 273-287.

* cited by examiner

POSITIONING SATELLITES

PRIORITY

The present U.S. Patent Application is a continuation application of U.S. patent application Ser. No. 13/517,027, filed Jun. 18, 2012, which is a 1.371 U.S. National Phase Application of International Application PCT/EP2009/067782, filed on Dec. 22, 2009.

The disclosure of the above priority application is incorporated herein, in its entirety, by reference.

The Annex referred to herein, is presented in the priority application, U.S. patent application Ser. No. 13/517,027, filed Jun. 18, 2012, now issued as U.S. Pat. No. 8,843,251, which is incorporated herein, in its entirety, by reference.

FIELD OF THE INVENTION

Embodiments of the present invention relate to positioning satellites. In particular, they relate to positioning satellites using solutions derived by geometric algebraic methods to equations of motion.

BACKGROUND TO THE INVENTION

Typically the differential equation of motion for a satellite orbiting the earth is solved numerically to determine the future positions of the satellites. This means that the determined future positions are only accurate with a limited time window typically a few hours.

BRIEF DESCRIPTION OF VARIOUS EMBODIMENTS OF THE INVENTION

According to various, but not necessarily all, embodiments of the invention there is provided embodiments as described in the appended claims.

Some embodiments of the invention by using geometric algebraic solutions enable long term accurate positioning without the need for current ephemeris data. The inherent accuracy of the geometric algebraic solutions (compared to numeric solutions) enables the positioning of an apparatus without having to download current ephemeris data.

Current positioning solutions (which use numeric solutions) require updated ephemeris data every 2 to 4 hours because the accuracy of the numeric solution decreases with time. The inventive solution proposed here is better able to accurately determine the future positions of satellites because it provides a geometric algebraic solution of designed (pre-determined) accuracy. It will be able to work accurately using ephemeris data for a chosen duration into the future that may be days, weeks or even months.

This will enable the positioning of an apparatus when it is switched on without first having to download the current ephemeris data. The location of the apparatus will therefore be determined more quickly.

The use of pre-calculated algebraic look-up tables may be used to provide fast positioning.

The (real world) position of an apparatus is a technical feature of the apparatus. Thus the positioning or locating of an apparatus provides technical effect.

In the example given below, the perturbation order determines the accuracy of the positioning calculation into the future. For longer term accuracy, more orders are required. As the perturbation calculation starts at the lowest order and the solution to that order is used to determine the solution to the next highest order, the perturbation calculation may be stopped at the required order of accuracy. A look up table may indicate the order required for a particular duration into the future. Thus the perturbation order may be a dynamic variable of the calculation.

The number of terms in the expansion (Annex pg 68) also affects the fundamental accuracy of the calculations. Accuracy may be improved by including more terms. Thus the number of terms may be a dynamic variable of the calculation.

It will be appreciated that real world positioning has many applications. It may, for example, be used in navigation apparatus, in emergency apparatus, in apparatus that provide location dependent services, etc.

Embodiments of the invention may result in a satellite positioning system transmitting less (or no) ephemeris data. This may result in fewer satellite tracking stations. This may enable the use of longer pseudo codes in satellite transmissions which would result in greater sensitivity of receivers. This could free up bandwidth in the satellite transmissions which could be used for other purposes.

Embodiments of the invention enables fast positioning by occasional-use positioning apparatus, that have pre-stored or 'old' ephemeris data.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
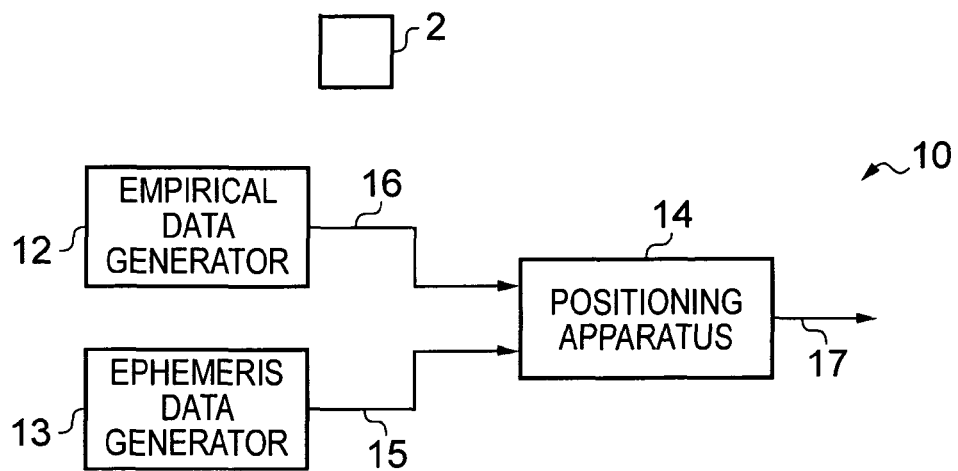
FIG. 1 schematically illustrates a satellite positioning system.

FIG. 1 schematically illustrates a satellite positioning system 10. The system 10 is capable of positioning one or more satellites 2. A satellite is an object that orbits a much greater mass such that the centre of the orbit can be approximated to the centre of the greater mass. Satellites may be earth satellites that orbit the earth. Earth satellites may be functional man-made satellites that orbit the Earth such as satellites in a Global Navigation Satellite System (GNSS). In FIG. 1, the satellite 2 is a space satellite high above the Earth.

The system 10 comprises: an empirical data generator 12; an ephemeris data generator 13; and a positioning apparatus 14. One or more of the components is located on the Earth.

The ephemeris data generator 13 provides ephemeris (orbit) data 15 to the positioning apparatus 14. Ephemeris data 15 is information about the position and velocity at a particular time of one or more satellites. The same or different particular times may be used for different satellites.

The empirical data generator 12 provides empirical based data 16 to the positioning apparatus 14. The empirically based data 16 accounts for the distribution of the mass of the Earth.

The positioning apparatus 14 uses the ephemeris data 15 and the empirically based data to determine the position 17 of the satellite 2. The positioning apparatus 14 may output the satellite position 17.

Although a single satellite 2 is illustrated, it should be appreciated that a plurality of satellites may be positioned by the positioning apparatus 14.

In some implementations the positioning apparatus 14 is part of a mobile terminal. In other implementations the positioning apparatus 14 is not part of a mobile terminal but communicates the satellite position 17 to a mobile terminal.

Figure 2:
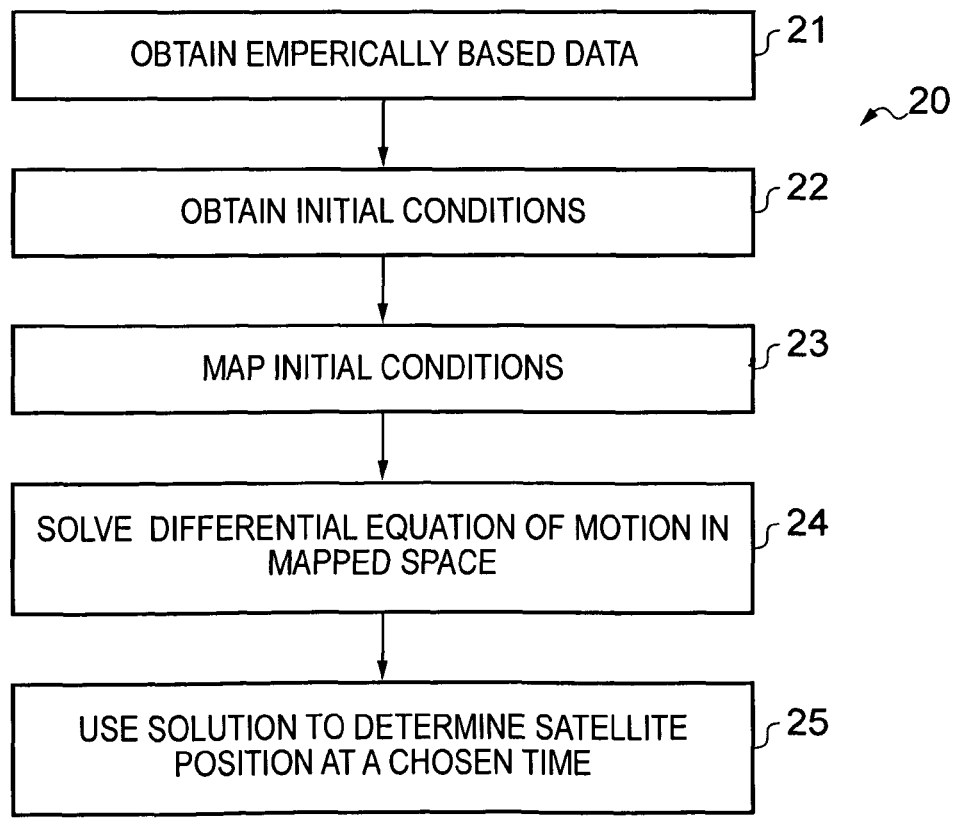
FIG. 2 schematically illustrates a method for determining a satellite position.

One example of how the positioning apparatus 14 can determine the satellite position 17 is illustrated in the method 20 of FIG. 2.

At block 21, the empirically based data 16 is obtained. The empirically based data takes account of the gravitational potential produced by the Earth's distributed mass.

At block 22, initial conditions for the satellite are determined from the ephemeris data 15. The initial conditions include $\dot{r}_{int}$ the vector velocity of the satellite at time $t_0$ and $r_{int}$ the vector position of the satellite at time $t_{int}$.

At block 23, the initial conditions are mapped using defined mappings from one variable space [r, t] to another variable space [U, s]. This produces initial conditions in [U, s] space.

At block 24, a differential equation of motion of the satellite, expressed using geometric algebra in terms of U and s is solved.

The differential equation of motion of the satellite, expressed using geometric algebra in terms of U and s comprises a constant based on the empirically based data 16 and this differential equation is solved using perturbation theory and the mapped initial conditions.

At block 25, an algebraic solution to the differential equation of motion of the satellite is used to determine the position of the satellite at a chosen time.

The use of algebraic as opposed to numerical solutions gives a solution that has a very long, theoretically infinite, validity period. The accuracy is selectable and depends upon the order of the perturbation solutions.

The time scale for updating the empirical based constant can be very long. It may have a period T1, where T1>N1, in different implementations N1 can have any one of the values greater than 1 day and less than 365 days.

The time scale for updating the empirical based constant can be very long. It may have a period T2, where T2>M1, in different implementations M1 can have any one of the values greater than 4 hours and less than 365 days. M1 may, for example, be 4 days or 2 weeks.

Explanation of the Mathematics

This section outlines the mathematics used in one method of positioning a satellite. A full and detailed explanation of the mathematics is included as an Annex to the description.

In this section, the Equations will identify vectors using bold notation. Vectors are identified by context within the description or may be identified using an underscore or bold font.

Equations of Motion in Terms of U

In this section the Kepler equation is re-expressed using the variables r and U giving a new equation of motion.

The Kepler Equation for motion in a gravitational field is:

$$\ddot{r} = -\frac{k\hat{r}}{r^2} + f \quad -4$$

(Annex Pg 10)
r is the distance of the satellite from the origin
f is a force that accounts for the distribution of the attracting mass Make the following definitions:

$$r = U^\dagger \sigma_1 U \quad -2$$

(Annex Pg 7)

$$\frac{d}{ds} = r\frac{d}{dt} \Rightarrow \frac{dt}{ds} = r = |U|^2 \quad -3$$

(Annex Pg 10)
$\sigma_1$ is a unit vector (later referred to as $\hat{r}_{int}$)
U is a geometric algebraic multivector (bivector)
Re-expressing Kepler's Equation of motion (equation 4) using geometric algebra in terms of U and f as defined in Equations 2 and 3 gives:

$$2\frac{d^2}{ds^2}U = EU + Urf \quad -5$$

(Annex Pg 11)
E is the Kepler energy $$\left(\frac{r^2}{2} - \frac{k}{r}\right) = E,$$

Perturbation Force

The perturbation force f may be expressed as a vector sum of a plurality of forces $f_i$ e.g. $f = \Sigma f_i$.

Kepler's equation assumes a point source for the mass. Let us assume that the component $f_i$ with the greatest influence on f deals with the effect of mass distribution, where $f_i$ which is the gravitational field created by the uneven distribution of the earth's mass. Then to the first order f can be approximated to $f_i$.

In this section the force f will be expressed using geometric algebra as a multi-pole function (when no axial symmetry is assumed) in terms of U.

The stages to this are:
a) Initially the multi-pole function is initially expressed in terms of P,
b) then in terms of an arbitrary coordinate system without assuming axial symmetry,
c) then finally expressed in terms of U.

Gravitational potential is expressed as:

$$\phi[r, t] = -G \int \frac{1}{|r - r'|} dm' \quad -6$$

(Annex Pg 12)
A multipole expansion is performed using geometric algebra as:

$$\frac{1}{|r-r'|} = \frac{1}{r}\left(1 + \sum_{n=1}^{\infty} P_n[r, r']\right) \qquad -1$$

where $$P_n[r, r'] = \sum_{k=0}^{Floor\left[\frac{n}{2}\right]} \left(-\frac{1}{2}C_{n-k}\right) * \left((n-k)C_{n-2k}\right) * \frac{(-2r \cdot r')^{n-2k}(r')^{2k}}{r^{2(n-k)}}$$

(Annex Pg 5)
where Pn is the Legendre polynomial of order n and Cn are the coefficients of a Taylor series (standard binomial coefficients). There is no assumption of spherical symmetry.

The gravitational potential can then be expressed using the multipole expansion (Equation 1)

$$\phi[r, t] = -G \int \frac{1}{r}\left(1 + \sum_{n=1}^{\infty} P_n[r, r']\right) dm'[r'] \qquad -7$$

(Annex Pg 12)
φ is the gravitational potential created by the uneven distribution of the earth's mass expressed as location dependent values.

We now define an arbitrary orthogonal rectilinear co-ordinate system

Let $\hat{u}$ be a unit vector in the direction of the axis of rotation. Let $\hat{v}$ and $\hat{w}$ represent unit vectors orthogonal to $\hat{u}$ and orthogonal to each other.

We can express r' as $$r' = u'\hat{u}' + v'\hat{v}' + w'\hat{w}'$$

where $$\hat{u}' = \hat{u}, \hat{v}' = \hat{v} \cos[\omega_{er}t] - \hat{w} \sin[\omega_{er}t],$$

$$\hat{w}' = \hat{v} \sin[\omega_{er}t] + \hat{w} \cos[\omega_{er}t]$$

The dashed unit vectors rotate with the body assumed to rotate with an angular velocity of $\omega_{er}$ about the axis parallel to $\hat{u}$ and passing through the center of gravity.

$$\hat{u} \cdot \hat{v} = 0, \hat{u} \cdot \hat{w} = 0, \hat{w} \cdot \hat{v} = 0 \qquad -8$$

(Annex Pg 15)
Re expressing Equation 7 using Equation 8

$$-G \int \frac{1}{r} P_n[r, r'] dm'[r'] = \qquad -9$$

$$-\frac{GM}{r} \sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2}C_{n-k[1]}\right) *$$

$$\left((n-k[1])C_{n-2k[1]} * (n-2k)C_i * (i-j)C_{k[2]} *\right.$$

$$jC_{k[3]} * (-2)^{n-2k[1]}(-1)^{k[3]}\left(\frac{R}{r}\right)^n * \left((\hat{r}, \hat{u})^{n-2k[1]-i}\right.$$

$$\left.(\hat{r}, \hat{v})^{i-j}(\hat{r}, \hat{w})^j\right) * (Cos[\omega_{er}t])^{i-j-k[2]+k[3]}$$

$$(Sin[\omega_{er}t])^{j+k[2]-k[3]}\right) * J[n][n-2k[1]-$$

$$i, i-k[2]+k[3], k[2]+k[3]][\hat{u}', \hat{v}', \hat{w}']$$

where $$J[n][p, q, r][\hat{u}', \hat{v}', \hat{w}'] =$$

$$\frac{1}{MR^n}\left(\int ((\hat{r}' \cdot \hat{u}')^p (\hat{r}' \cdot \hat{v}')^q (\hat{r} \cdot \hat{v}')^r)(r')^n dm'[r']\right)$$

(Annex Pg 29/30)
$J[n][p, q, r][\hat{u}', \hat{v}', \hat{w}']$ is a multipole constant (henceforth referred to as J) that can be empirically determined. It is a set of n constants for a given set of parameters [p, q, r] and a given co-ordinate system $[\hat{u}', \hat{v}', \hat{w}']$. Although described as a constant, it should be appreciated that J may be conveyed as a set of constant values, one for each n, or may be conveyed as a single constant value (the integral) with the set of constant values being determined later using M, R and n. Once the vectors $\hat{u}$, $\hat{v}$, $\hat{w}$ have been fixed J is a constant.

Use the gravitational potential expressed in Equation 9 to express the perturbation field f $$\partial_r\left(-G\int \frac{1}{r} P_n[r, r'] dm'[r']\right) = \qquad -10$$

$$\partial_r\left(-\frac{GM}{r} \sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2}C_{n-k[1]}\right) *\right.$$

$$\left((n-k[1])C_{n-2k[1]}\right) * (n-2k)C_i *$$

$$iC_j(i-j)C_{k[2]} * jC_{k[3]} * (-2)^{n-2k[1]}(-1)^{k[3]}$$

$$(R)^n \left(\frac{1}{r}\right)^{n+1} \left((\hat{r} \cdot \hat{u})^{n-2k[1]-i}(\hat{r} \cdot \hat{v})^{i-j}(\hat{r} \cdot \hat{w})^j\right) *$$

$$((Cos[\omega_{er}t])^{i-j-k[2]+k[3]}(Sin[\omega_{er}t])^{j+k[2]-k[3]}) *$$

$$\left.J[n][n-2k[1]-i, i-(k[2]+k[3]), k[2]+k[3]][\hat{u}, \hat{v}, \hat{w}]\right)$$

(Annex Pg 34)
This can be alternatively expressed as $$\partial_r\left(-G \int \frac{1}{r} P_n[r, r'] dm'[r']\right) = \qquad (11)$$

$$-GM \sum_{k[1]=0}^{Floor\left[\frac{n}{2}\right]} \sum_{i=0}^{n-2k[1]} \sum_{j=0}^{i} \sum_{k[2]=0}^{i-j} \sum_{k[3]=0}^{j} \left(-\frac{1}{2}C_{n-k[1]}\right) *$$

$$\left((n-k[1])C_{n-2k[1]} * (n-2k)C_i * iC_j * (i-j)C_{k[2]} *\right.$$

$$jC_{k[3]} * (-2)^{n-2k[1]}(-1)^{j-k[3]}\left(\frac{R}{r}\right)^n *$$

$$((Cos[\omega_{er}t])^{i-j-k[2]+k[3]}(Sin[\omega_{er}t])^{j+k[2]-k[3]}) * J[n][$$

$$n-2k[1]-i, i-(k[2]+k[3]), k[2]+k[3]][\hat{u}, \hat{v}, \hat{w}] *$$

$$r^{-2}((-(2(n-k[1])+1)\hat{r})(\hat{r}, \hat{u})^{n-2k[1]-i}$$

$$(\hat{r}, \hat{v})^{i-j}(\hat{r}, \hat{w})^j + (((n-2k[1])-i)$$

$$(\hat{r}, \hat{u})^{n-2k[1]-i-1}\hat{u})(\hat{r}, \hat{v})^{i-j}(\hat{r}, \hat{w})^j) +$$

$$((\hat{r}, \hat{u})^{n-2k[1]-i}((i-j)(\hat{r}, \hat{v})^{i-j-1}\hat{v})(\hat{r}, \hat{w})^j) +$$

$$((\hat{r}, \hat{u})^{n-2k[1]-i}(\hat{r}, \hat{v})^{i-j}(j(\hat{r}, \hat{w})^{j-1}\hat{w}))$$

(Annex Pg 36)
Equations of Motion Expressed in Terms of U and Perturbation Force
Re-express the equation of motion (Equation 5) using Equation 11

$$2\frac{d^2}{ds^2}U - EU = Ur\left(\sum_{n=2}^{\infty} \partial_r\left(-G\int \frac{1}{r}P_n[r,r']dm'[r']\right)\right) = \qquad -12$$

$$-GM\left(\sum_{n=2}^{\infty}\sum_{k[1]=0}^{Floor[\frac{n}{2}]}\sum_{i=0}^{n-2k[1]}\sum_{j=0}^{i}\sum_{k[2]=0}^{i-j}\sum_{k[3]=0}^{j}\left(-\frac{1}{2}C_{n-k[1]}\right)*\right.$$

$$\left((n-k[1])C_{n-2k[1]}*(n-2k)C_i * iC_j * (i-j)C_{k[2]} *\right.$$

$$jC_{k[3]} * (-2)^{n-2k[1]}(-1)^{j-k[3]}\left(\frac{R}{r}\right)^n *$$

$$\left((\text{Cos}[\omega_e r t])^{i-j-k[2]+k[3]}(\text{Sin}[\omega_e r t])^{j+k[2]-k[3]}\right)*$$

$$J[n][n-2k[1]-i,$$

$$i-(k[2]+k[3]), k[2]+k[3]][\hat{u}, \hat{v}, \hat{w}] *$$

$$Urr^{-2}((-(2(n-k[1])+1)\hat{r})$$

$$\left(\frac{((\sigma_1 U^2)\hat{u} + \hat{u}(\sigma_1 U^2))}{2|U|^2}\right)^{n-2k[1]-i}$$

$$\left(\frac{((\sigma_1 U^2)\hat{v} + \hat{v}(\sigma_1 U^2))}{2|U|^2}\right)^{i-j}$$

$$\left(\frac{((\sigma_1 U^2)\hat{w} + \hat{w}(\sigma_1 U^2))}{2|U|^2}\right)^j + \left((n-2k[1]-\right.$$

$$i)\left(\frac{((\sigma_1 U^2)\hat{u} + \hat{u}(\sigma_1 U^2))}{2|U|^2}\right)^{n-2k[1]-i-1}$$

$$\hat{u}\left)\left(\frac{((\sigma_1 U^2)\hat{v} + \hat{v}(\sigma_1 U^2))}{2|U|^2}\right)^{i-j}$$

$$\left(\frac{((\sigma_1 U^2)\hat{w} + \hat{w}(\sigma_1 U^2))}{2|U|^2}\right)^j +$$

$$\left(\left(\frac{((\sigma_1 U^2)\hat{u} + \hat{u}(\sigma_1 U^2))}{2|U|^2}\right)^{n-2k[1]-i}\right.$$

$$\left((i-j)\left(\frac{((\sigma_1 U^2)\hat{v} + \hat{v}(\sigma_1 U^2))}{2|U|^2}\right)^{i-j-1}\right.$$

$$\hat{v}\right)\left(\left(\frac{((\sigma_1 U^2)\hat{w} + \hat{w}(\sigma_1 U^2))}{2|U|^2}\right)^j\right) +$$

$$\left(\left(\frac{((\sigma_1 U^2)\hat{u} + \hat{u}(\sigma_1 U^2))}{2|U|^2}\right)^{n-2k[1]-i}\right.$$

$$\left(\frac{((\sigma_1 U^2)\hat{v} + \hat{v}(\sigma_1 U^2))}{2|U|^2}\right)^{i-j}$$

$$\left(j\left(\frac{((\sigma_1 U^2)\hat{w} + \hat{w}(\sigma_1 U^2))}{2|U|^2}\right)^{j-1}\hat{w}\right)\right)$$

(Annex Pg 43/44)
Given the initial position vector $\hat{r}_{Init}$ and velocity vector $\dot{\hat{r}}_{Init}$ of the orbiting body, we can specify the bivector component of the U to be proportional to $\hat{r}_{Init}\dot{\hat{r}}_{Init}$ i.e.

$$\langle U \rangle_{>2} = a\hat{r}_{Init}\dot{\hat{r}}_{Init}$$

where a is some scalar that is to be specified later. $\langle U \rangle_2$ is in the plane of the angular momentum of the satellite.

(Annex Pg 40)
Using $$\sigma_1 U^\dagger = U\sigma_1$$

(Annex Pg 43)

$$\sigma_1 = \hat{r}_{Init}$$

(Annex pq 44)

Define $$\kappa[U, \hat{r}_{Init}, \dot{\hat{r}}_{Init}, \hat{w}] = \frac{((\beta^2 - \alpha^2)\hat{r}_{Init}, \hat{w} + 2\alpha\beta\dot{\hat{r}}_{Init}, \hat{w})}{r_{Init}}$$

where $$\beta = \langle U \rangle_0$$

and $$\alpha = \langle U \rangle_2(\dot{\hat{r}}_{Init} \wedge \hat{r}_{Init})$$

(Annex Pg 47)
The division by $r_{int}$ maintains precision.
Define a new constant $$\Gamma_n[U, \hat{u}, \hat{v}, \hat{w}, \hat{r}_{Init}, \dot{\hat{r}}_{Init}] = \qquad -13$$

$$\left(\sum_{p=0}^{\infty}(-1)^p\left(\frac{|U|^2}{r_{Init}} - 1\right)^p\right)^{2n+1}\sum_{i=0}^{n-2k[1]}\sum_{j=0}^{i}\sum_{k[2]=0}^{i-j}\sum_{k[3]=0}^{j}\left(-\frac{1}{2}C_{n-k[1]}\right)*$$

$$((n-k[1])C_{n-2k[1]}*(n-2k)C_i * iC_j *$$

$$(i-j)C_{k[2]} * jC_{k[3]} * (-2)^{n-2k[1]}(-1)^{j-k[3]} *$$

$$((\text{Cos}[\omega_e r t])^{i-j-k[2]+k[3]}(\text{Sin}[\omega_e r t])^{j+k[2]-k[3]})) *$$

$$J[n][n-2k[1]-i, i-(k[2]+k[3]), k[2]+k[3]]$$

$$[\hat{u}, \hat{v}, \hat{w}] * \left((-(2(n-k[1])+1)\hat{r})\left(\frac{|U|^2}{r_{Init}}\right)^{2k[1]}\right.$$

$$(k[U, \hat{r}_{Init}, \dot{\hat{r}}_{Init}, \hat{u}])^{n-2k[1]-i}$$

$$(k[U, \hat{r}_{Init}, \dot{\hat{r}}_{Init}, \hat{v}])^{i-j}$$

$$(k[U, \hat{r}_{Init}, \dot{\hat{r}}_{Init}, \hat{w}])^j +$$

$$\left(\frac{|U|^2}{r_{Init}}\right)^{2k[1]+1}((n-2k[1]-i)-1)$$

$$(k[U, \hat{r}_{Init}, \dot{\hat{r}}_{Init}, \hat{u}])^{n-2k[1]-i-1}\hat{u}\right)$$

$$(K[U, \hat{r}_{Init}, \dot{\hat{r}}_{Init}, \hat{v}])^{i-j}$$

$$(K[U, \hat{r}_{Init}, \dot{\hat{r}}_{Init}, \hat{w}])^j +$$

$$\left(\frac{|U|^2}{r_{Init}}\right)^{2k[1]+1}\left((k[U, \hat{r}_{Init}, \dot{\hat{r}}_{Init}, \hat{u}])^{n-2k[1]-i}\right.$$

$$((i-j)(k[U, \hat{r}_{Init}, \dot{\hat{r}}_{Init}, \hat{v}])^{i-j-1}\hat{v})$$

$$(k[U, \hat{r}_{Init}, \dot{\hat{r}}_{Init}, \hat{w}])^j) +$$

$$\left(\frac{|U|^2}{r_{Init}}\right)^{2k[1]+1}\left((k[U, \hat{r}_{Init}, \dot{\hat{r}}_{Init}, \hat{u}])^{n-2k[1]-i}\right.$$

$$(k[U, \hat{r}_{Init}, \dot{\hat{r}}_{Init}, \hat{v}])^{i-j}$$

-continued $$\left(j(k[U, \hat{r}_{Init}, \hat{r}_{Init}, \hat{w}])^{j-1} \hat{w}\right)\right)$$

(Annex Pg 55/56)

This is a constant for at a particular initial condition defined in the co-ordinate system u, v, w. It is empirically based as it depends upon J. Although described as a constant, it should be appreciated that $\Gamma$ is a set of constant values, one for each n.

Re-express Equation 12 using Equation 13

$$2\frac{d^2}{ds^2}U - EU = -\frac{1}{r_{Init}}\hat{r}_{Init}UGM \qquad -14$$

$$\left(\sum_{n=2}^{\infty}\left(\frac{R}{r_{int}}\right)^n \Gamma_n[U, \hat{u}, \hat{v}, \hat{w}, \hat{r}_{Init}, \hat{r}_{Init}]\right)$$

(Annex Pg 56/57)

$\underline{f}$ is thus expressed using geometric algebra in terms of U. It is a multipole function that includes an empirically based constant $\Gamma$.

The Equation is then solved using perturbation theory, Define $$\epsilon = -\frac{1}{r_{Init}} \Rightarrow r_{Init} = -\frac{1}{\epsilon} \qquad -15$$

&

$$U = \sum_{i=0}^{\infty} \epsilon^1 U_1 \qquad -16$$

(Annex Pg 65)

And let $$\omega = \sum_{i=0}^{\infty} \epsilon^1 \omega_1$$

Where $$\frac{-E}{2} = \omega^2$$

(Annex Pg 66)

Defining $$\Gamma_n[U, \hat{u}, \hat{v}, \hat{w}, \hat{r}_{Init}, \hat{r}_{Init}] = \sum_{i=0}^{\infty} \epsilon^i \sum_{j=0}^{\lambda_{\Gamma,n,i}} \alpha_{\Gamma,n,i,j} e^{j\omega_{\Gamma,n,i,j}s} \qquad (17)$$

(Annex Pg 74)

The perturbed equation of motion is given by $$\sum_{i=0}^{i} \epsilon^i \left(\frac{d^2}{ds^2}U_i + \left(\sum_{k=0}^{i} U_{i-k}\left(\sum_{j=0}^{k} \omega_{k-j}\omega_j\right)\right)\right) = \qquad (18)$$

$$\frac{1}{2}\sum_{i=0}^{0} \epsilon^{i+1}\left(\hat{r}_{Init}GM\left(\sum_{n=2}^{\lambda_{Multipole}}\left(\frac{R}{r_{Init}}\right)^n * \right.\right.$$

$$\left.\left.\left(\left(\sum_{j=0}^{i} U_{i-j}\Gamma_{n,j}[U, \hat{u}, \hat{v}, \hat{w}, \hat{r}_{Init}, \hat{r}_{Init}]\right)\right)\right)\right)$$

and the following three equations:

$$\sum_{i=0}^{i} \epsilon^i \left(\sum_{j=0}^{i} \omega_{i-j}\omega_j\right) = -\frac{E}{2} \qquad (19)$$

$$r_{Init} = \sum_{i=0}^{i} \epsilon^i \left(\sum_{j=0}^{i} U_{i-j, Init} U_{j, Init}\right) \qquad (20)$$

$$r_{Init}\hat{r}_{Init} = \sum_{i=0}^{i} \epsilon^i \left(\sum_{j=0}^{i} (U'_{i-j, Init}U_{j, Init} + U_{i-j, Init}U'_{j, Init})\right) \qquad (21)$$

(Annex Pg 76)

A solution of the following form is assumed:

$$x[s] = ae^{j\omega s} + be^{-j\omega s} + \sum_{i=1}^{n} \frac{A_i}{\omega^2 - \alpha_i^2} e^{j\alpha_i s} \qquad (22)$$

(Annex Pg 77)

where, the following stability condition holds:

$$A_i = 0 \text{ when } \omega^2 - \alpha_i^2 = 0 \qquad (23)$$

(Annex Pg 78)

$$U_i[s] = \sum_{j=0}^{\lambda_{U,i}} \alpha_{U,i,j} e^{j\omega_{U,i,j}s} \qquad (24)$$

$$U[s] = \sum_{i=0}^{1} \epsilon^i \sum_{j=0}^{\lambda_{U,i}} \alpha_{U,i,j} e^{j\omega_{U,i,j}s} \qquad (25)$$

$$U[s]U[s]^\dagger = \sum_{i=0}^{2} \epsilon^i \left(\sum_{j=0}^{\lambda_{UU^\dagger,i}} \alpha_{UU^\dagger,i,j} e^{j\omega_{UU^\dagger,i,j}s}\right) \qquad (26)$$

$$t = \sum_{i=0}^{2} \epsilon^i \sum_{j=0}^{\lambda_{tExpr,i}} \alpha_{tExpr,i,j} e^{j\omega_{tExpr,i,j}s} \qquad (27)$$

(Annex Pg 83/84)

It should also be noted that from Equation 2

$$U_0^\dagger = r_{Init}^{\frac{1}{2}} \qquad (28)$$

(Annex Pg 87)
also from Equation 2

$$\frac{1}{2} r_{Init}^{\frac{1}{2}} r_{Init} \hat{r}_{Init} = \frac{dU_0^\dagger}{ds} \bigg|s=0 \quad (29)$$

(Annex Pg 87)

The method 30 described with reference to FIG. 3 determines an unknown satellite position at a particular time. It illustrates some of the blocks of FIG. 2 in more detail.

The object of block 31 is to determine the multipole constants J up to a certain order (see equations 9 and 13 and Annex pg 29/30) that takes account of the gravitational potential produced by a distributed mass.

The method of FIG. 2 can be adapted to determine the multipole constants J up to a certain order, which when used in the method of FIG. 2 determines a known satellite position at a particular time.

By using additional ephemeris data that accurately identifies satellite positions at different times, it is possible to generate a series of equations in which the unknown is the multipole constants J to the desired order. Optimisation techniques may then be used to determine the common unknown multipole constants.

For example, if the positions $r_i$ of a satellite are known accurately at different times $t_i$, then there will be values $s_i$ associated with $t_i$. Substituting $r_i$ and $t_i$ into the Equations 3 and 25 results in two equations with unknowns J and the respective $s_i$.

These equations may be solved using least mean square techniques. Many different accurate positions for the same satellite $r_i$ at known times $t_i$ may be used to increase accuracy. The method may also be repeated with additional satellites to increase accuracy.

The multi-pole constants J to the respective order is empirically determined as it is based on accurate ephemeris data which may be in the past.

At block 32, ephemeris data defining the initial conditions of a satellite are mapped or transformed. The initial conditions are mapped using defined mappings from one variable space [r, t] to another variable space [U, s]. This produces initial conditions in [U, s] space.

The initial conditions include:
$\dot{r}_{int}$ is the vector velocity of the satellite at time $t_{int}$
$r_{int}$ is the vector displacement of the satellite at time $t_{init}$
The equations 28 and 29 are used to perform the mapping.

At block 33, a force constant Γ that is used to define the gravitational force in [U, s] space is determined.

Equation 13 is used calculate $r_n[U, \hat{u}, \hat{v}, \hat{w}, \hat{r}_{Init}, \dot{r}_{Init}]$ The force constant Γ is dependent upon the co-ordinate system $\hat{u}, \hat{v}, \hat{w}$ and on the initial conditions $\underline{r}_{init}, \underline{r}_{int}$. It should therefore be updated whenever new ephemeris data is to be used. In some embodiments, the force constant may be distributed with or at the same time as the ephemeris data 14. For each, the force constant Γ need only be calculated once to yield a function in terms of U given the co-ordinate system and initial conditions.

It will be appreciated from Equation 13 that the force constant Γ is dependent upon J and that Γ is also empirically based.

The empirically based data 13 produced by the empirical data generator 12 may be either the multipole constant J or the force constant Γ.

At block 24, a differential equation of motion of the satellite, expressed using geometric algebra in terms of U and s is solved. The block includes sub-blocks 34 to 38.

The differential equation of motion of the satellite, expressed using geometric algebra in terms of U and s comprises the force constant Γ (see Equation 14). This differential equation may, for example, be solved using perturbation theory and the mapped initial conditions as explained in more detail below.

At block 34, the differential equations for the different orders of perturbation are solved to a target order of perturbation. In this example, they will be solved to the second order but in other examples a different target order for solution may be chosen.

The first order differential equation is solved to determine Uo

The next order differential equation is simplified using the first order differential equation and its determined solution Uo. The equation is then solved to determine $U_1$ In general, the $r^{th}$ order differential equation is simplified using the $(r-1)^{th}$ order differential equation and its determined solutions Ui. The equation is then solved to determine $U_r$.

The process is continued until the target order is reached and completed. The target order determines accuracy.

The general solution $U_i$ is found by solving equations 17 to 21 using the stability condition of Equation 23 as a constraint. (see Annex pgs 60 to 83)

At block 35, express the obtained solutions Ui for each perturbation order using the algebraic equation 24 and determine the coefficients of Equation 22.

$$U_i[s] = \sum_{j=0}^{\lambda_{U,i}} \alpha_{u,i,j} e^{j\omega_{u,i,j}s} \quad (24)$$

At block 36, algebraically express U using the algebraic expression for Ui from Equation 24 in Equation 25 and determine the coefficients of Equation 25.

$$U[s] = \sum_{i=0}^{1} \epsilon^i \sum_{j=0}^{\lambda_{U,i}} \alpha_{U,i,j} e^{j\omega_{U,i,j}s} \quad (25)$$

At block 37, algebraically express $U[a]U[a]^\dagger$ using the algebraic expression for U from Equation 25 in Equation 26 and determine the coefficients of Equation 26.

$$U[s]U[s]^\dagger = \sum_{i=0}^{2} \epsilon^i \left( \sum_{j=0}^{\lambda_{UU^\dagger,i}} \alpha_{UU^\dagger,i,j} e^{j\omega_{UU^\dagger,i,j}s} \right) \quad (26)$$

At block 38, algebraically express $\int_o^{S_i} U[s]U[s]^\dagger ds$ using the algebraic expression for $U[s]U[s]^\dagger$ from Equation 26 in Equation 27 to determine the coefficients of Equation 27.

$$t = \sum_{i=0}^{2} \epsilon^i \sum_{j=0}^{\lambda_{tExpr,i}} \alpha_{tExpr,i,j} e^{j\omega_{tExpr,i,j}s} \quad (27)$$

At block 25, an algebraic solution to the differential equation of motion of the satellite is used to determine the position of the satellite at a chosen time. Block 25 comprises the sub-blocks 40 to 42.

Equation 27 is an algebraic function that relates a time variable t to a first mapped variable s. The coefficients of this equation have been determined at block 38. At block 40, this algebraic equation is used to convert a time variable value $t_1$-$t_{init}$ to a first value $s_1$ of the first mapped variable.

Equation 25 is an algebraic function that relates the first mapped variable s to the second mapped variable U. The coefficients of this equation have been determined at block 36. At block 41, this algebraic equation is used to convert the first value $s_1$ of the first mapped variable s to a second value $U(s_1)$ of a second mapped variable U.

The satellite is positioned at block 42 by converting the second value $U(s_1)$ of the second mapped variable to a position value $r_{t1}$ that positions the satellite. The mapping between [r, t] and [U, s] (Equation 2) is used to determine $r_{t1}$ $$r_{t_1} = U^\dagger [S_1] \dot{r}_{Init} U[S_1]$$

The position value can then be stored in a memory for future use in applications.

This approach provides an algebraic solution the accuracy of which is dependent upon the target order of perturbation elected and used. The accuracy is not time dependent. Assuming there is no change to the perturbation force the validity period is theoretically infinite at an accuracy determined by the 'depth' of algebraic solution (i.e. the target order of perturbation used). Consequently there is no requirement to repeatedly send or receive ephemeris data and ephemeris data may be pulled by the positioning apparatus rather than pushed to the positioning apparatus.

Figure 3:
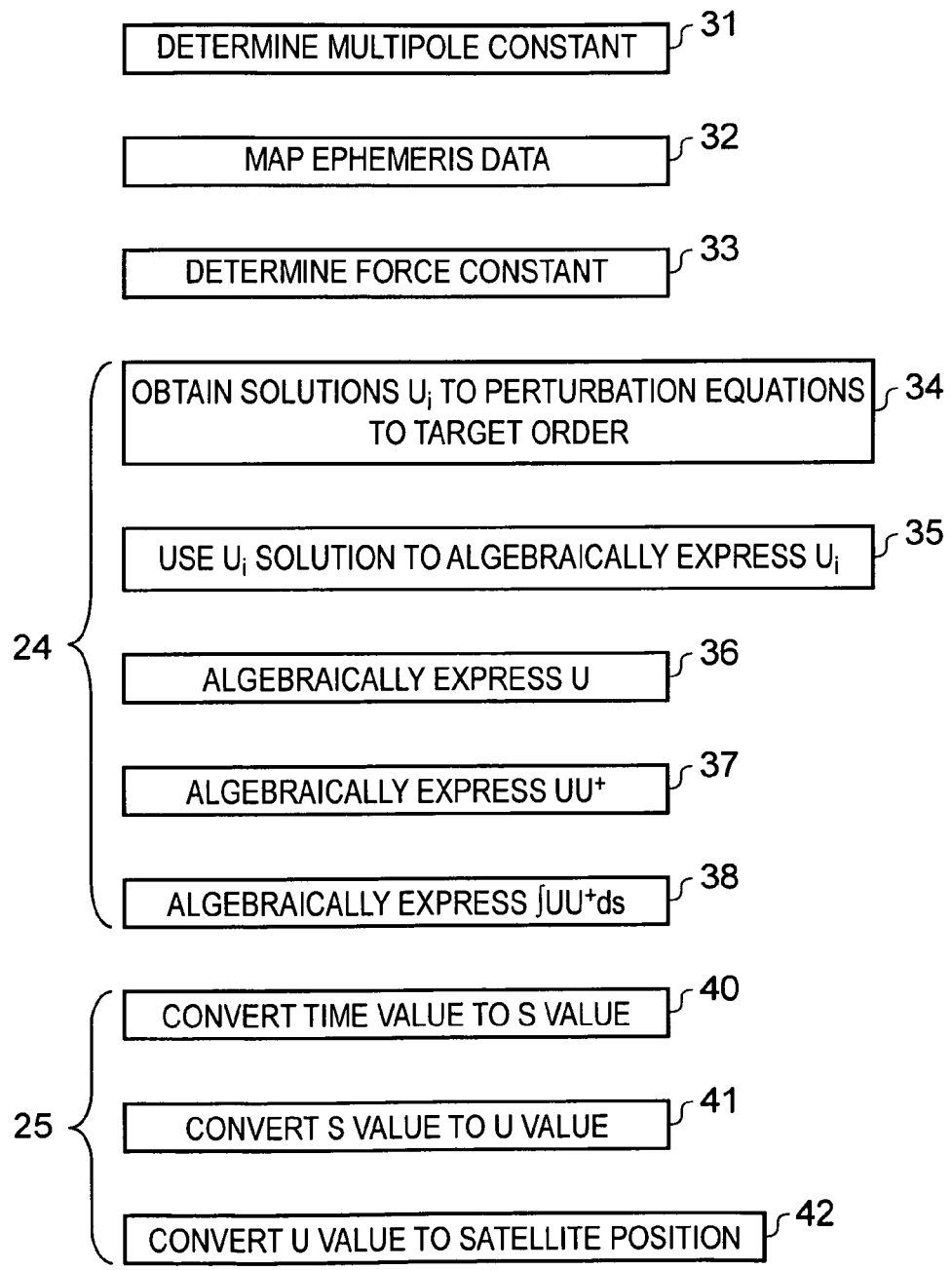
FIG. 3 schematically illustrates, in detail, for determining an unknown satellite position at a particular time.

It should be appreciated that the various blocks in FIGS. 2 and 3 need not be performed by a single apparatus.

For example, the boundary conditions (Equations 19, 20, 21) may be expressed in a look-up table in terms of the variables a, b, $\omega_o$, and the initial conditions $\underline{\dot{r}}_{int}$, $\underline{r}_{int}$.

When the initial conditions are defined by received ephemeris data the three boundary conditions are expressed in terms of variables a, b, $\omega_o$ in a look-up table.

The three equations in three unknowns can be solved using standard processes (Annex pg 83) to provide a, b, $\omega_o$, The equation below may be expressed in a look-up table as a function of a, b, $\omega_o$, t, and s:

$$t - t_0 = \int_o^{s_i} U[s] U[s]^\dagger ds$$

Once a, b, $\omega_o$ have been determined for a set of initial conditions $\underline{\dot{r}}_{int}$, $\underline{r}_{int}$, the value s at any arbitrary future time t can be simply determined.

The equation below may be expressed in a look-up table as a function of a, b, $\omega_o$, and s (Annex pg 82):

$$U[s] = \sum_{i=0}^{1} \epsilon^i \sum_{j=0}^{\lambda_{u,i}} \alpha_{U,i,j} e^{j \omega_{U,i,j} s}$$

Substituting the values of a, b, $\omega_o$, and s provides U[s], The position can then be simply calculated $$r_{t_1} = U^\dagger [S_1] \dot{r}_{Init} U[S_1]$$

It is therefore possible to perform a large amount of pre-processing to obtain geometric algebraic look-up tables, which can be simply used to calculate the position. It will be appreciated that the exact extent and nature of the pre-processing may vary from implementation to implementation.

If more than on constellation may be used for positioning (e.g. GPS, Galileo, Clonass etc), then it may be advantage to nest the look-up tables such that those relating to a particular constellation are stored logically together. This improves access speed.

Figure 4:
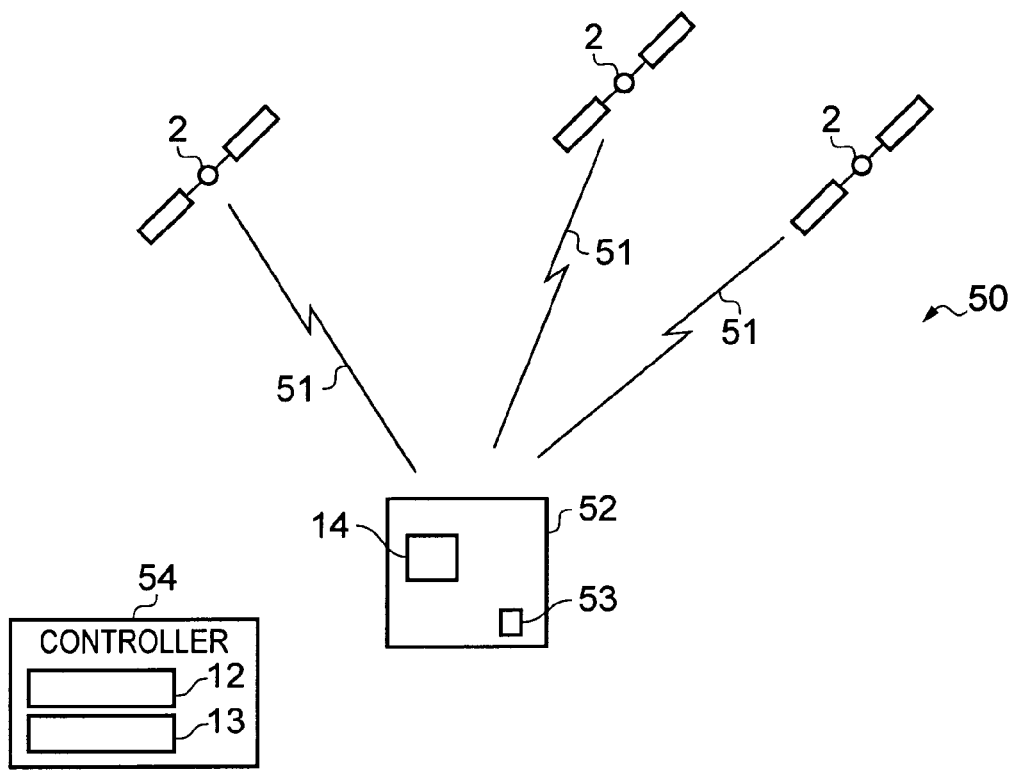
FIG. 4 schematically illustrates a Global Navigation Satellite System (GNSS)

Referring to FIG. 4 the blocks 31, 32, 33, 24, 25 may be carried out in different locations in different apparatus.

It may, for example, be advantageous to have block 31 performed where there is access to accurate satellite positioning information. This may also be where the ephemeris data 15 is generated.

The block 32 (mapping ephemeris data) may, for example, occur before or after distribution of ephemeris data 15.

The block 33 (determining force constant) may, for example, occur before distribution of the ephemeris data 15 and, for example be distributed with the ephemeris data 15. Alternatively, the block 33 (determining force constant) may, for example, occur after receiving distributed ephemeris data 15.

The block 24 (determining the coefficients of the algebraic expressions) may, for example, occur before distribution of the ephemeris data 15 and/or force constant and the coefficients may be distributed with the ephemeris data and/or force constant. Alternatively, the block 24 (determining the coefficients of algebraic expressions) may, for example, occur after receiving distributed ephemeris data and after receiving or generating the force constant.

The block 25 (determining position) may, for example, occur before distribution of the ephemeris data and, for example, be distributed with the ephemeris data. Alternatively, the block 33 (determining force constant) may, for example, occur after receiving or determining the coefficients of the algebraic expressions.

In one implementation a mobile terminal may perform blocks 31, 32, 33, 24 and 25. In another implementation a mobile terminal may perform only blocks 32, 33, 24 and 25. In another implementation a mobile terminal may perform only blocks 33, 24 and 25. In another implementation a mobile terminal may perform only blocks 24 and 25. In another implementation a mobile terminal may perform only block 25.

FIG. 4 schematically illustrates a Global Navigation Satellite System (GNSS) 50.

The system 50 comprises: a plurality of GNSS communication satellites 2 for transmitting positioning signals 51 and one or more mobile receiver terminals 52.

A mobile receiver terminal 52 receives the positioning signals from at least some of the satellites and at least partially processes the positioning signals to determine the distance of each satellite from the mobile receiver terminal 52.

The mobile receiver terminal 52 determines the position 53 of the mobile receiver terminal 52 by using the determined distance values for each satellite and obtained accurate positions for each satellite. The mobile receiver terminal 52 use the satellites positions and their distances to determine the position 53 of the mobile receiver terminal 52. The position 53 may be stored in a memory of the mobile receiver terminal 52.

Typically four or more satellites need to be in sight and the satellite positions need to be accurate.

This system 50 may advantageously use or include the satellite positioning system 10 to provide long-term accurate satellite positions.

For example, in this example the GNSS system 50 includes a system controller 54 that comprises the empirical data generator 12 and the ephemeris data generator 13. In other implementations the empirical data generator 12 and the ephemeris data generator 13 may be housed separately using the system controller 52 or elsewhere.

In the illustrated example, the empirical data generator 12 determines and distributes the multipole constant J and the force constant Γ. The empirical data generator 12 performs blocks 31, 32 and 33 of FIG. 3. However, in other implementations the empirical data generator 12 determines and distributes only the multipole constant J and the force constant Γ is determined elsewhere. It may, for example, be determined in the positioning apparatus 14.

In this illustrated example, the positioning apparatus 14 is integrated within the mobile terminal 52. The positioning apparatus performs blocks 24 and 25 to determine and store satellite positions 17. The satellite positions are used to determine and store the position 53 of the mobile receiver terminal. In other implementations the positioning apparatus 14 may be located outside the terminal and may provide the satellite positions 17 to the mobile receiver terminal 52.

The mobile receiver terminal 52 need not be a dedicated GNSS terminal. The terminal may, for example, have functionality for other uses. It may, for example, also operate as a personal digital assistant and/or a cellular phone and/or a personal music player and/or a personal video player and/or a personal computer etc.

There is no significant time delay in positioning the terminal 52 immediately after starting-up the terminal 52. The position apparatus 14 can determine the position 17 of a satellite without needing to acquire current ephemeris data. This allows positioning services to be available immediately when the terminal 52 is started.

In one embodiment, the terminal 52 has two modes of operation. It has a first positioning mode that requires the regular receipt of ephemeris data because it expires after a few hours. It has a second positioning mode, based on the method 30 of FIG. 3, which performs block 25 to determine a satellite position 17. It may be possible for the terminal 52 to start-up in the second mode to provide instantaneous positioning and then switch to the first mode when updated ephemeris data is received. It may be possible for the terminal 52 to switch from the second mode to the first mode when it is determined that the first mode is inaccurate or potentially inaccurate. The determination of possible inaccuracy may occur, for example, by having a validity period for ephemeris data, after which that data expires and is no longer accurate. The determination of possible inaccuracy may occur, for example, by regularly performing the first mode and the second mode in parallel and determining when the resulting positions determined using the two modes are significantly different.

In another embodiment, the first mode and the second mode are performed in parallel and differences in results are used to correct for clock drift.

Figure 5:
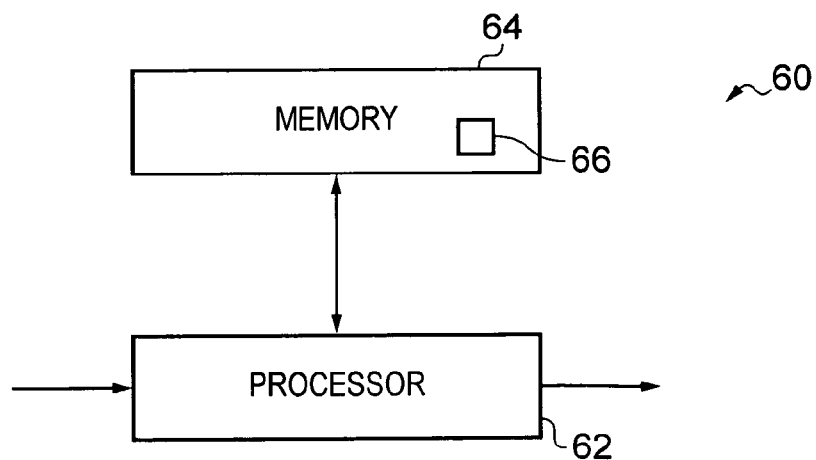
FIG. 5 schematically illustrates a controller.
Figure 6:
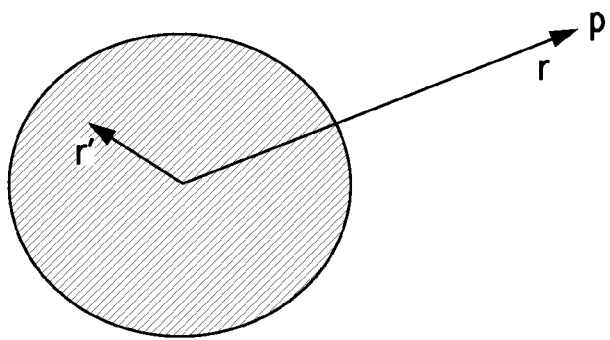
FIG. 6 schematically illustrates the relationship between r, r', and point P.
Figure 7:
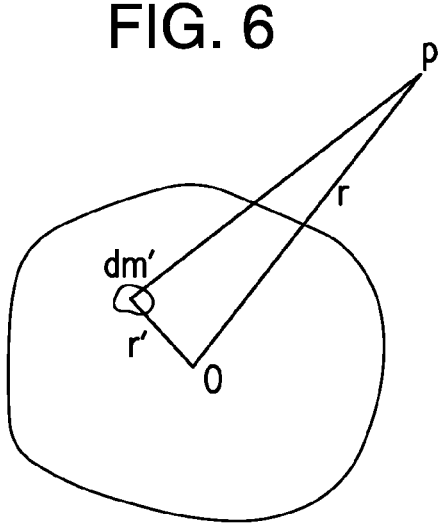
FIG. 7 schematically illustrates the relationship between O, r, point P, r', and the mass dm'.
Figure 8:
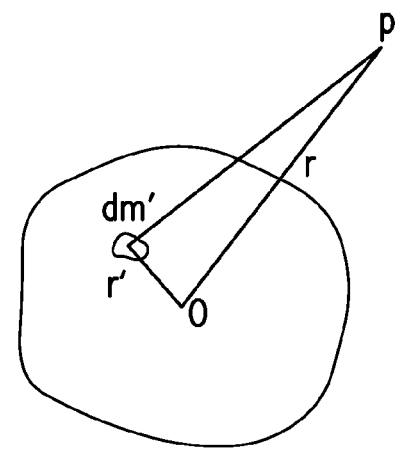
FIG. 8 schematically illustrates the relationship between O, r, point P, r', and the mass dm'.
Figure 9:
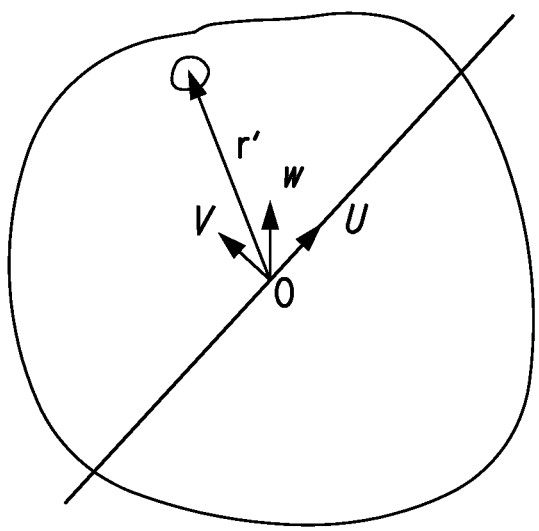
FIG. 9 schematically illustrates the relationship between O, U, V, w, and r'.
Figure 10:
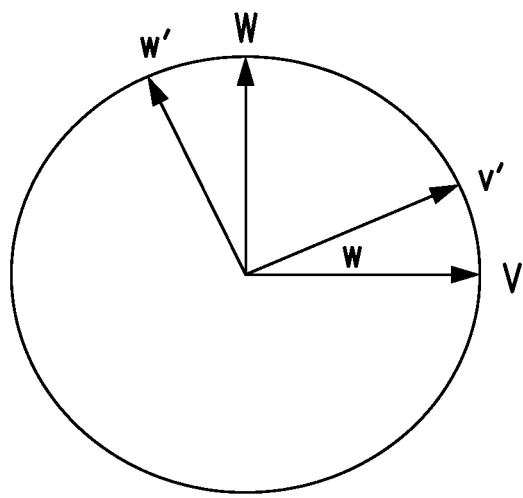
FIG. 10 schematically illustrates the relationship between w, V, v', w', and W.

FIG. 5 schematically illustrates a controller 60 suitable for performing one or more of the blocks illustrated in the FIGS. 2 and/or 3. A controller of this type may be used as the empirical data generator 12 and/or the ephemeris data generator 13 and/or the positioning apparatus 14.

The controller 60 may be implemented using instructions that enable hardware functionality, for example, by using executable computer program instructions in a general-purpose or special-purpose processor that may be stored on a computer readable storage medium (disk, memory etc) to be executed by a processor.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions that control the operation of a host apparatus when loaded into the processor 62. The computer program instructions 66 provide the logic and routines that enables the apparatus to perform the methods illustrated in FIGS. 2 & 3. The processor 62 by reading the memory 64 is able to load and execute the computer program 66.

The computer program may arrive at the apparatus via any suitable delivery mechanism. The delivery mechanism may be, for example, a computer-readable storage medium, a computer program product, a memory device, a record medium such as a CD-ROM or DVD, an article of manufacture that tangibly embodies the computer program. The delivery mechanism may be a signal configured to reliably transfer the computer program 53. The apparatus may propagate or transmit the computer program as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

It should be appreciated that determining the position of a satellite has many uses.

It may be used to position GNSS satellites. It may be used to position and track other satellites such as space debris, which may be used to produce collision warnings.

It may be used to position a satellite even after the ephemeris data has 'expired' and new ephemeris data is not available. It may be used for low power measuring of movement of a positioning apparatus 14. this may be useful when measuring landslip, structural failure, tectonic plate movement etc.

Various components may have been described as connected in the preceding paragraphs. It should be appreciated that they may instead be operationally coupled and any number or combination of intervening elements can exist (including no intervening elements)

Reference has been made to various examples in the preceding description. It should be understood that reference to an example implies that alternative, but not necessarily explicitly disclosed implementations can be used.

The blocks illustrated in FIGS. 2 and 3 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

As used here 'apparatus' includes devices, modules, systems. Module refers to a unit or apparatus that excludes certain parts/components that would be added by an end manufacturer or a user.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method in a receiver apparatus configured to receive positioning signals from Global Navigation Satellite System (GNSS) satellites, comprising:
    positioning the receiver apparatus at a time value by, for each of a plurality of GNSS satellites:
    using an algebraic solution of a differential equation of motion of the GNSS satellite to determine a position of the GNSS satellite at the time value;
    using positioning signals received at the receiver apparatus at the time value from the GNSS satellite; and
    having received, for each of the plurality of the GNSS satellites, first information for defining a first algebraic function that relates a time variable to a first mapped variable, performing long-term-accurate-positioning of each of the plurality of the GNSS satellites without a need for receiving updated ephemeris data by:
    using the first information defining the first algebraic function to convert the time value of the time variable to a first value of the first mapped variable;
    converting the first value of the first mapped variable to a second value of a second mapped variable; and
    positioning the GNSS satellite by converting the second value of the second mapped variable to a position value that positions the GNSS satellite at the time value.

2. The method as claimed in claim 1, wherein using an algebraic solution of a differential equation of motion of the GNSS satellite to determine a position of the GNSS satellite at the time value comprises using pre-calculated algebraic look-up.

3. The method as claimed in claim 2, comprising using nested look-up tables for multiple different constellations of GNSS satellites.

4. The method as claimed in claim 1, wherein the first algebraic function is based upon an algebraic solution to a geometric algebraic differential equation of motion of a GNSS satellite.

5. The method as claimed in claim 1, wherein the first information includes coefficients for defining the first algebraic function.

6. The method as claimed in claim 1, wherein a second algebraic function that relates the first mapped variable to the second mapped variable is used to convert the first value of the first mapped variable to the second value of the second mapped variable.

7. The method as claimed in claim 1, wherein the second algebraic function is an algebraic solution to the differential equation of motion of the satellite.

8. The method as claimed in claim 1, further comprising receiving second information for defining the second algebraic function.

9. The method as claimed in claim 1, wherein the second information includes coefficients for defining the second algebraic function.

10. The method as claimed in claim 1, wherein the first and second algebraic functions are expressed using complex exponential functions.

11. The method as claimed in claim 1, wherein the differential equation of motion is $$2\frac{d^2}{ds^2}U - EU = U\underline{rf}$$

where
E is a constant
U is the second mapped variable and is defined by $\underline{r} = U^+ \sigma_1 U$
$\sigma_1$ has a constant unit length
s is the first mapped variable and is defined by $$\frac{d}{ds} = r\frac{d}{dt}$$

and
$\underline{f}$ is expressed using geometric algebra in terms of U.

12. The method as claimed in claim 1, wherein after the receiver apparatus has been switched on using pre-stored first information, providing the algebraic solution of a differential equation.

13. A receiver apparatus for positioning signals from Global Navigation Satellite System (GNSS) satellites, comprising:
    a processing circuitry;
    a memory storing instructions which when loaded into the processor enable the receiver apparatus to perform positioning at a time value by, for each of a plurality of the GNSS satellites, comprising:
    using an algebraic solution of a differential equation of motion of the GNSS satellite to determine a position of the GNSS satellite at the time value;
    using positioning signals received at the receiver apparatus at the time value from the GNSS satellite; and
    having received, for each of the plurality of the GNSS satellites, first information for defining a first algebraic function that relates a time variable to a first mapped variable, performing long-term-accurate-positioning of each of the plurality of the GNSS satellites without a need for receiving updated ephemeris data by:
    using the first information defining the first algebraic function to convert the time value of the time variable to a first value of the first mapped variable;
    converting the first value of the first mapped variable to a second value of a second mapped variable; and
    positioning the GNSS satellite by converting the second value of the second mapped variable to a position value that positions the GNSS satellite at the time value.

14. A non-transitory computer-readable storage medium having stored therein instructions, that when executed by a computing device, cause the computing device to perform positioning a receiver apparatus at a time value by, for each of a plurality of Global Navigation Satellite System (GNSS) satellites, comprising:
- using an algebraic solution of a differential equation of motion of the GNSS satellite to determine a position of the GNSS satellite at the time value;
- using positioning signals received at the receiver apparatus at the time value from the GNSS satellite; and
- having received, for each of the plurality of the GNSS satellites, first information for defining a first algebraic function that relates a time variable to a first mapped variable, performing long-term-accurate-positioning of each of the plurality of the GNSS satellites without a need for receiving updated ephemeris data by:
- using the first information defining the first algebraic function to convert the time value of the time variable to a first value of the first mapped variable;
- converting the first value of the first mapped variable to a second value of a second mapped variable; and
- positioning the GNSS satellite by converting the second value of the second mapped variable to a position value that positions the GNSS satellite at the time value.

\* \* \* \* \*